Figure 1:
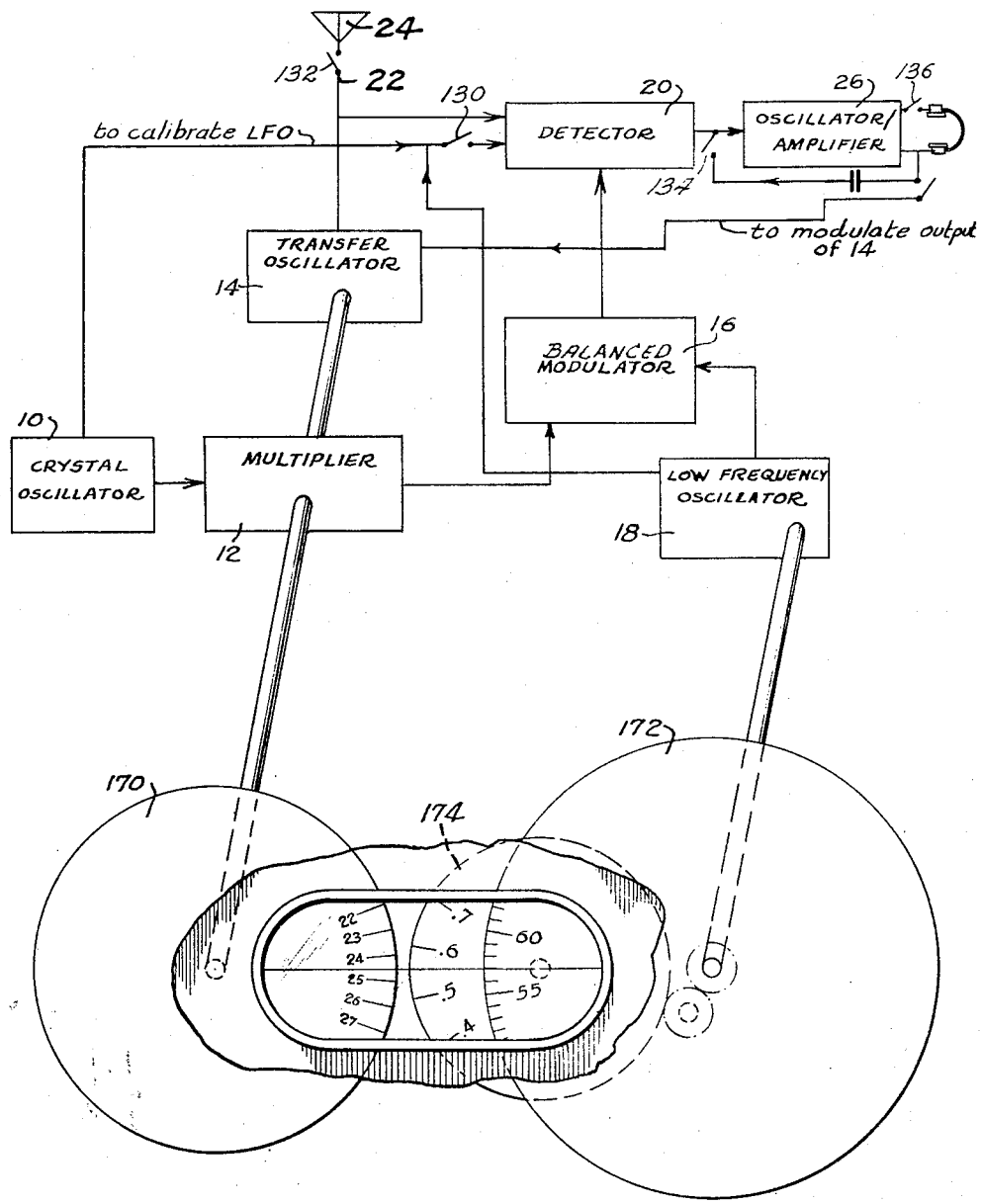

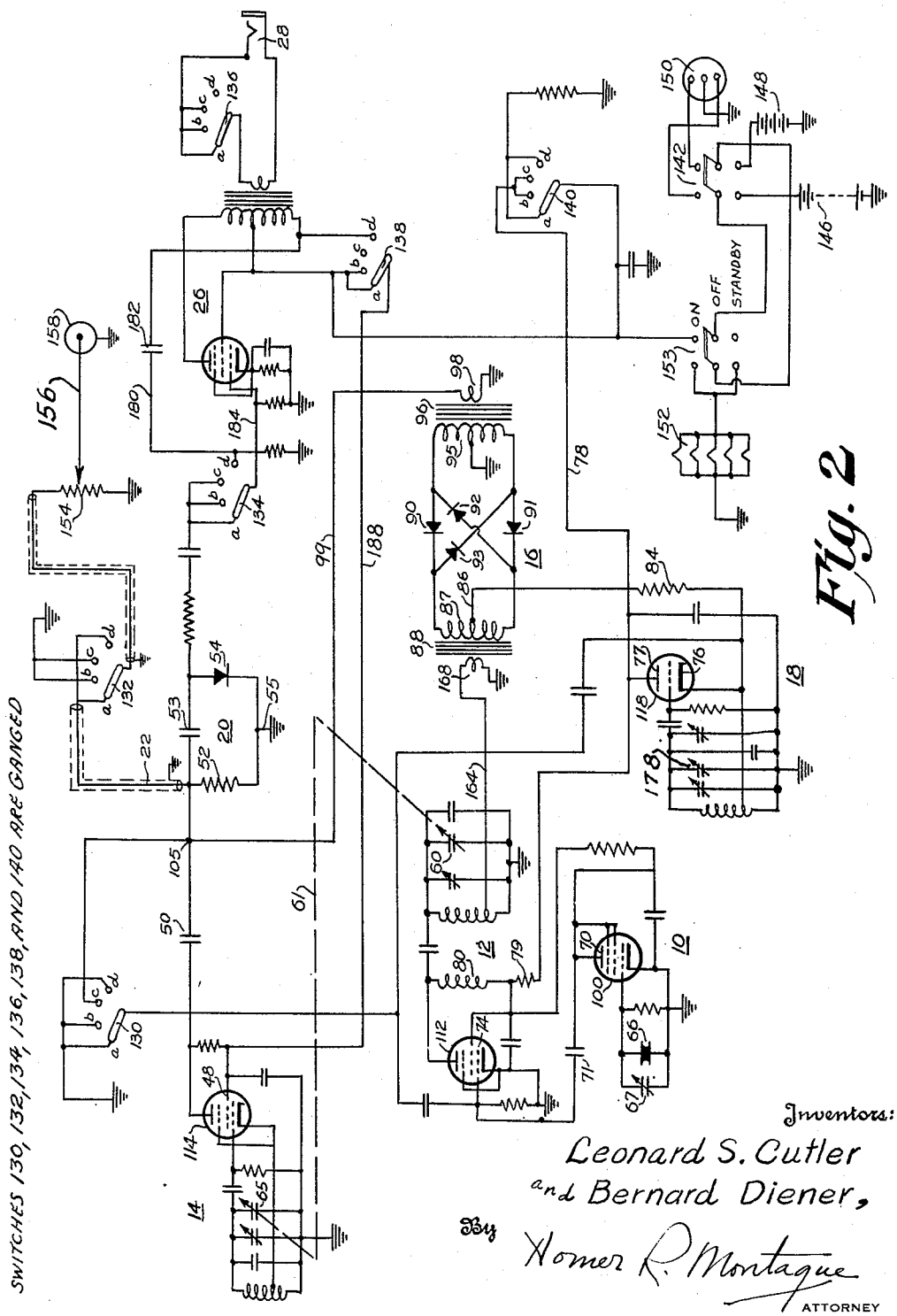

Patented Oct. 12, 1954

2,691,762

UNITED STATES PATENT OFFICE 2,691,762

DIRECT READING VERNIER HETERODYNE VERY HIGH-FREQUENCY METER

Leonard S. Cutler, Los Angeles, and Bernard Diener, Culver City, Calif., assignors to Gertsch Products, Inc., Los Angeles, Calif., a corporation of California Application June 5, 1951, Serial No. 230,062

11 Claims. (Cl. 324—79)

1

This invention relates generally to improvements in frequency measuring and signal generating devices.

More specifically, this invention relates to an improved wide-range frequency meter and signal generator of the heterodyne type adapted to serve the dual function of accurately measuring and directly indicating the frequency of a signal of unknown frequency, and of generating a desired frequency to a high degree of accuracy.

A primary object of the invention is to provide a direct reading heterodyne type frequency meter and signal generator wherein the frequency of an unknown VHF signal, or of a generated VHF signal, may be directly read to an accuracy of at least .005% without employement of elaborate or cumbersome calibration charts, reduction gearing or band-spread devices. This facilitates the design with particular reference to relatively small and portable instruments, but the same features are of course applicable to larger and more accurate equipments of the same type.

Another object is to provide an improved method of devising a matching frequency from two component frequencies, one of which is stabilized to a high degree of accuracy and is employed both to produce a relatively high frequency carrier and to calibrate a tunable low frequency signal which modulates the stabilized high frequency in such a manner as to produce a high difference frequency, which in turn may be used to match an unknown frequency or to act as a signal to the frequency of which may be accurately determined by direct reading of the component frequencies employed to initiate said difference frequency.

It has heretofore been proposed to incorporate, in a frequency meter, signal generator, or similar equipment, a highly stabilized reference oscillator, such as a crystal-controlled oscillator, and to utilize the accurately determined harmonics of the fundamental frequency of such oscillator to establish a plurality of frequencies which can be compared with an unknown signal in order to measure the frequency of the latter. Also, in order to permit the measurement of frequencies lying between the harmonics of the crystal oscillator, it has been proposed to provide a so-called interpolation oscillator whose output frequency range is sufficient to cover the band between adjacent crystal harmonic frequencies, and to mix the output of this variable-frequency oscillator with the appropriate crystal harmonic in order to produce side-band frequencies capable of matching any unknown frequency within

2 the range of the instrument. Such prior proposals, however, have been subject to various disadvantages, among which are the difficulty of filtering out the unwanted modulation products between the crystal harmonic and the output of the variable interploation oscillator, the necessity of referring to tables and charts for translation of the settings of the oscillators into actual frequency values, the ambiguity which exists because of the difficulty of determining which crystal harmonic is being utilized at each time, as well as which of the modulation products is being compared with the unknown frequency, and the relatively complex equipment and circuitry required by such prior designs.

The present invention incorporates ways and means by which a single stabilized and accurate reference oscillator serves as the source of a plurality of accurate harmonic frequencies which are utilized as carrier frequencies capable of being modulated by the signal from a variable-frequency oscillator to provide a signal of any desired frequency, and in which the modulation frequency itself is also accurately determined by comparison with the reference oscillator. In order to eliminate the effect of undesired harmonics, the unknown signal is first compared with the variable frequency generated by a "transfer" oscillator whose tuning control is linked to the tuning control of the harmonic amplifier or generator excited by the reference oscillator. The act of adjusting the transfer oscillator to match the unknown signal thus accomplishes two things simultaneously: it gives a direct reading of the order or approximate magnitude of the unknown signal; for example, its dial may indicate directly the first two significant figures of the desired measurement, and it also automatically adjusts the tuning control of the harmonic generator excited from the reference oscillator so that the harmonic appropriate to the order of magnitude being measured appears in the output of the harmonic generator with much higher amplitude than do any of the other harmonics not needed for the particular measurement under consideration. This completely eliminates any ambiguity as to whether the proper harmonic is being utilized.

Inasmuch as the modulation products between the selected harmonic of the reference oscillator and the output of the variable frequency interpolation oscillator would normally include, in addition to these two frequencies themselves, the sum and difference frequencies thereof, as well as frequencies having values twice those of the said two frequencies, the result of merely mixing the two frequencies would be to provide an output including several frequencies any one of which might be that desired and necessary to zero-beat the unknown frequency or the frequency of the transfer oscillator as matched therewith. The problem of filtering out these unwanted modulation products is a serious one, involving numerous expensive filters which increase the cost of the equipment as well as representing space and weight which are undesirable, especially in an instrument intended for portable use. The present invention eliminates the need for these filters by an ingenious combination of the use of a lattice-type modulator for combining the selected harmonic frequency and the output of the interploation oscillator which inherently suppresses both of those frequencies as such, as well as the double frequencies, and the selection of the tracking relationship between the transfer oscillator and the harmonic generator, and the frequency range of the interpolation oscillator, so as automatically to eliminate either one of the sum and difference frequencies. Since the frequency range of the interpolation oscillator need encompass only the spectrum length between adjacent harmonics of the reference oscillator, its dial or dials can be calibrated directly with sufficient accuracy to indicate the remaining significant figures of the desired or measured frequency without mechanical complications and without the need for charts, tables or the like.

The invention further includes a particular arrangement of the dials controlling the harmonic generator and the interpolation oscillator so that their respective readings appear side by side in such a way as to permit the entire frequency reading to be obtained at a glance and without calculation of any kind.

A further object of the invention is to provide a frequency meter or signal generator of the above general type, in which certain of the components have multiple functions, whereby the size, weight and complexity of the device are reduced, together with a switching system by which the various circuits can be adjusted readily for the performance of the necessary functions of generation, measurement and calibration, by the operation of a single control.

The above and other objects and advantages of the invention, and a preferred way of accomplishing the same, will best be understood from the following detailed specification of a selected and exemplary embodiment thereof, reference being had to the accompanying drawings. However, it is to be understood that certain of the advantages of the entire invention can be obtained by applying the same principles to other specific combinations of components; for example, the novel principles of the invention are capable of producing an accurately known frequency for any purpose whatever, and not only for measurement purposes. Thus, the principles hereof may be adapted to the control of the exciter oscillator of a radio transmitter or the like, providing a variable frequency transmitter having very simple controls, and for other equivalent purposes. Moreover, while the invention as exemplified herein utilizes the harmonics of a single crystal-controlled oscillator, it is equally possible to utilize a plurality of accurately known fundamental frequencies, crystal-controlled or otherwise. Such changes in design and application do not necessarily depart from the principles of the invention, and are to be understood as included in the scope thereof except as it may be limited by the claims appended hereto and forming a part of this application.

In the drawings,

Fig. 1 is a block diagram of the invention as embodied in a frequency measuring equipment, and indicating also the ganged relationship of the tuning controls of the transfer oscillator and the harmonic generator, and Fig. 2 is a complete schematic diagram of the preferred embodiment of the invention.

Referring to Fig. 1, crystal oscillator 10 serves as a frequency standard, and hence is designed for a high degree of temperature stability, and conveniently, but not necessarily, is arranged to operate at a frequency of one megacycle and to be readily adjustable to exactly that frequency by reference to any primary or secondary standard available. The output of oscillator 10 is fed to a tuned crystal harmonic multiplier 12, the tuning condenser in the tank circuit of which is gang-connected to the tank tuning condenser of a high frequency electron-coupled transfer oscillator 14 for synchronized tracking therebetween for a purpose later described. A selected harmonic output signal from multiplier 12 is fed to a balanced modulator 16 which also receives the output signal from an auxiliary or interpolation oscillator 18 and operates in such a manner as to suppress the carrier frequency from multiplier 12 and the modulating signal from oscillator 18, and to pass on only the sum and difference signals resulting from the mixing of the relatively high frequency signal from multiplier 12 with the relatively lower frequency signal from oscillator 18 for matching with the output signal of transfer oscillator 14, as evidenced by a zero-beat condition established in detector 20.

Detector 20 is employed initially (when the device is used for measuring an unknown frequency) to develop a difference frequency voltage between an unknown input signal (received via a conduit 22 or antenna 24) and a matching frequency produced by transfer oscillator 14, after which the input signal is disconnected, and the difference frequency from modulator 16 is zero-beat with the output of transfer oscillator 14. The signal from detector 20 is fed through a conventional audio amplifier 26, the output of which may be connected to headphones or other means for indication of the zero beat condition.

The circuit details, as schematically shown in Fig. 2, cover the components shown in the block diagram of Fig. 1, the component circuits being bracketed with like numerals to facilitate reference. Transfer oscillator 14 is of the conventional electron-coupled type wherein the screen grid 48 of pentode tube 114 serves as the plate of a Hartley oscillator, with tube 114 serving as both an oscillator and an amplifier. The fundamental range of this oscillator may be, for example, from 20 to 40 megacycles per second (mc.), with harmonics through the twelfth being employed for complete coverage from 20 to 480 mc. The plate load circuit is left untuned for increased harmonic output. The amplified output signal is fed through blocking capacitor 50 to detector circuit 20 comprising resistor 52, capacitor 53, and a germanium crystal diode 54, the circuit being grounded at 55. The manner in which signals are introduced to or fed out of the system, through coaxial line 22.

will later be described in connection with the switching arrangement.

The harmonic multiplier 12 includes a pentode tube 112 and is of conventional design with the exception that its tuned plate circuit includes a variable condenser 60, mechanically connected, as shown at 61, for gang tuning with the variable condenser 65 of transfer oscillator 14. Condensers 60 and 65 are so designed, with respect to the inductance and capacitance values of the respective intercoupled tuned circuits as to insure selection, for a particular setting of transfer oscillator 14, of a resonant condition of harmonic multiplier 12 for producing a particular harmonic of crystal oscillator 10 at high level, and effective suppression of all other crystal harmonics. Crystal oscillator 10 includes a pentode tube 100, connected as a triode, and employs a frequency standard crystal 66, subject to only slight frequency shift with temperature variations, the circuit being provided with a trimmer condenser 67 for correction of the crystal frequency to that of a frequency standard. The plate 70 of tube 100 is connected, through blocking condenser 71, to the control grid 74 of tube 112 in a known manner.

Auxiliary or interpolation oscillator 18, employing a triode 118, may also be of the well-known Hartley type, with a cathode 76 above ground potential, and is designed, in the embodiment being described, to generate any desired frequency in the range from 1 to 2 megacycles per second. Plate 77 is energized through conductor 78, which also leads through resistance 79 and high frequency choke 80 to the plate or anode of tube 112. Cathode 76 of auxiliary oscillator tube 118 is connected through resistor 84 to a center tap 86 of the secondary winding 87 of the input transformer 88 of the balanced lattice modulator or mixer 16. Modulator 16 is of the lattice type employing plural germanium crystal diodes 90, 91, 92 and 93 respectively, in the manner shown, for operation in a known manner. A modulator of this type is shown and well described in French Patent No. 739,103, granted October 24, 1932. The primary winding 95 of output transformer 96 is grounded at its midpoint to provide a return circuit to auxiliary oscillator 18. Secondary or output winding 98 of transformer 96 is connected by lead 99 to a junction 105 between the output circuit of transfer oscillator 14, the coaxial lead-in 22, and the detector circuit 20. Thus, by means of switches to be described, the desired combinations of signals may be presented to detector 20 to enable comparison thereof by the usual zero-beat method.

As above mentioned, an unknown signal can be introduced to the system, or a signal of known frequency obtained therefrom, by means of a switching arrangement. A four position six-gang switching unit is connected in the manner shown for the purpose of connecting the component circuits in four arrangements, as later described, to permit their functioning in ways which will be designated, for brevity, Beat, Read, Calibrate, and Modulate. A brief description of the functioning of the device under these four conditions will facilitate understanding the operation. When the gang switch is set in the Beat position, the crystal oscillator 10, multiplier 12 and the auxiliary oscillator 18 are deenergized (by interruption of their plate and screen voltages), and the conductor 22 and transfer oscillator 14 are connected to the input of detector 20, to enable comparison of the output of said oscillator 14 with an unknown signal arriving through that conductor, or (when using the device as a signal generator), to enable the output of oscillator 14 to be supplied to the conductor for external use. Audio amplifier 26 is energized in this switch position so as to enable detection of the beat note, if any, in the output of detector 20.

When the gang switch is set in Read position, conductor 22 is disconnected from the signal input (detector 20), the crystal oscillator 10, multiplier 12, transfer oscillator 14 and auxiliary oscillator 18 are energized, and the signal outputs of the transfer oscillator 14 and modulator 16 are applied to detector 20, to enable the transfer oscillator to be set at the identical frequency generated by the modulation of the harmonic from the multiplier by the output of the auxiliary or interpolation oscillator. In the Calibrate position of the switch, the fundamental frequency produced by reference oscillator 10 is applied to the detector, along with the output of the auxiliary oscillator, to enable calibration of the dial of the latter at check points established by the crystal or reference oscillator. While the harmonic multiplier stage is still energized at this time, its output does not confuse the operator because at any position of dial 170 the harmonic output from 12 is of very much smaller magnitude than that of oscillator 10. In the Modulate position, which is employed when it is desired to generate an accurate frequency for external use and carrying an audio-frequency modulation component, the connections are the same as in the Beat position, except that audio amplifier 26 is re-connected as an audio oscillator with its output employed to modulate the plate and screen of the transfer oscillator 14.

The manner in which the above functions are obtained will be well understood by examining, in Fig. 2, the six switches 130, 132, 134, 136, 138 and 140. Each comprises a rotatable blade or the like which can contact any one of four terminals, these being designated by the letters a to d used as subscripts with the corresponding reference numerals for the switches in the following description. Switch 130 operates to direct the outputs of crystal oscillator 10 and auxiliary oscillator 18 to detector 20 (at junction 105) when in position c (Calibrate), and to interrupt this connection in all other positions. Terminals a, b and d are grounded in these other positions, but the outputs of the two oscillators referred to are not shunted to ground because the lead from switch 130 to each of the oscillator output circuits includes an appropriate capacitor. Switch 132 connects the signal input and output circuit to conductor 22, and hence to the transfer oscillator 14 and detector 20, in positions a and d, for Beat and Modulate, but disconnects this circuit in the intervening Read and Calibrate positions. Switch 134 connects the audio amplifier 26 to the output of detector 20 in positions a, b and c, for beat-note detection, but in position d (Modulate), the switch connects the lower end of the output transformer of the amplifier to its control grid for oscillator operation. The output circuit of this transformer is connected by switch 136 to the headphone jack 28 in positions a, b and c, but is disconnected in the Modulate position.

Switch 138 has its movable blade or arm connected to the plate and screen electrodes of the transfer oscillator 14, and in positions a and b completes the plate supply voltage to this oscillator from the batteries or power supply plug. In position c, this switch disables transfer oscillator by interrupting its plate supply (for Calibrate operation), and in position d (Modulate) the switch supplies to the transfer oscillator a plate and screen voltage derived from the amplifier/oscillator 26, now connected as an oscillator and audio modulating the output of the transfer oscillator. Finally, switch 140 operates to interrupt the supply of plate voltage to crystal oscillator 10, multiplier 12 and auxiliary oscillator 18 in positions a and d (Beat and Modulate), a bleeder resistor being connected to the plate supply line in these positions to maintain the voltage supplied to the other component circuits at approximately the same level. A Two-pole, two-position switch 142 is provided for selecting filament, plate, and screen potentials either from internal batteries 146 and 148, or from an external source led in through connector 150. The heater elements of the various tubes are illustrated at 152, with the plate and screen circuits being connected either directly or through dropping resistances to the plate voltage supply as shown. An "on-off-standby" switch 153 enables the heaters to be kept energized, with the plate and screen voltages disconnected, in a well-known manner.

The tuning of oscillator 14 results in the simultaneous selection of the resonance frequency of the multiplier circuit 12 and hence the particular harmonic of crystal controlled oscillator 10 to be employed, and thus the "carrier" frequency provided by harmonic generator 12 to be modulated by the signal of auxiliary oscillator 18 in the modulator is automatically set, to the practical exclusion of other crystal harmonics. The fixed and ganged adjustable components of the tuning circuits of oscillator 14 and multiplier 12 are designed to effect tracking of the tuned circuit of harmonic generator or multiplier 12 at 1.5 megacycles above the adjusted frequency of oscillator 14, so that the carrier fed from harmonic generator 12 to modulator 16 will lie between 1 and 2 mc. above the adjusted frequency of oscillator 14, and hence the same amount above the frequency of the unknown signal when zero beat is achieved.

The function of auxiliary oscillator 18 is to produce an output signal, variable through a frequency range of one to two mc., to be heterodyned with the frequency of the harmonic generator 12 and thus to supply a difference frequency which will match the frequency of the transfer oscillator and of the input signal at a particular dial setting indicated on a geared-down dial to permit accurate reading directly in decimal fractions of megacycles. This is accomplished by utilizing the output of the auxiliary oscillator to modulate the output of the harmonic generator, used as a carrier source, the modulating signal and carrier being fed to the balanced lattice modulator or mixer 16 wherein the frequency of the carrier is caused to beat with the frequency of the auxiliary oscillator in such a manner that the difference frequency output will equal exactly the frequency of transfer oscillator 14 which has been matched previously with the frequency of the unknown signal. It is apparent that since the frequency of the harmonic multiplier 12 is above the frequency of oscillator 14, a zero-beat condition can be effected between the signals from oscillator 14 and modulator 16 only by the difference signal between multiplier 12 and low frequency oscillator 18, and that the sum signal may be ignored. The circuit arrangement for accomplishing this result is explained below in greater detail.

Operation of the device as a heterodyne frequency meter, is as follows: With gang switch 130 to 140, herein termed the function switch, set at the Beat position, i. e. with its movable arms engaging contacts a, coaxial line 22 is connected, through a second coaxial line and through part of a grounded potentiometer 154, line 156, and terminal 158, to a source of unknown frequency, such as from a radio receiver. The unknown signal is thus fed to the detector circuit 20, and from an examination of the circuitry and what has already been said it will be seen that the function switch has operatively connected the transfer oscillator, detector and audio amplifier circuits while disconnecting plate or anode supply leads of the crystal oscillator, frequency multiplier and auxiliary oscillator circuits. The transfer oscillator is then tuned, with headphones inserted in jack 28, for a zero-beat condition between the unknown signal and the output of that oscillator, the method of observing that condition through audible observation of the detector output signal being well known in the art.

The function switch is now turned to the Read position, i. e. with its arms engaging contacts b. In this position the unknown signal is disconnected, but the transfer oscillator 14 remains operative to feed a signal of identical frequency to detector 20. Plate and screen voltages are now connected to crystal oscillator 10, frequency multiplier 12 and auxiliary oscillator 18, to place those circuits in an operative condition. As heretofore stated, the tuning of transfer oscillator 14 to match the frequency of the unknown signal has resulted, by reason of the gang connection between the tunable components of that circuit and the tunable components of frequency multiplier circuit 12, in the selection of that harmonic of crystal oscillator 10 which is between 1 and 2 megacycles higher than the frequency of transfer oscillator 14. Since crystal oscillator 10 is functioning, the said harmonic thereof which falls within the resonance band or selectivity curve of multiplier circuit 12 is amplified in that circuit, with attenuation of all other crystal harmonics, and is supplied as a carrier, by conduit 164, to primary winding 168 of the input transformer 88 of balanced lattice modulator 16. Since this carrier is a harmonic multiple of the crystal controlled circuit 10, the frequency of which has been adjusted by trimmer condenser 67 to exactly 1 megacycle and calibrated as later described, the dial 170 of Fig. 1, which is mechanically connected to the gang-tuned components of circuits 12 and 14, is accurately readable, in whole megacycles, to indicate said carrier frequency. It will be noted that the output signal from transfer oscillator 14 passes through capacitor 50 to detector 20, to which is also connected the secondary 98 of the output transformer 96 of modulator circuit 16, and since the two signals applied to the modulator circuit 16 are not of the same frequency, the usual sum and difference signals are fed to detector 20. As has been stated, the lattice type of modulator inherently suppresses both of the original frequencies themselves, and their doubles. The function of auxiliary oscillator 18, as previously mentioned, is to produce an output signal which can be made to equal the difference between the output frequencies of circuits 12 and 14 and which is readable to a high degree of accuracy on an associated dial 172, 174, as shown in Fig. 1. The output of auxiliary oscillator 18 is fed as a modulating signal to the mid-points of coils 87 and 95 of circuit 16, with the carrier from multiplier circuit 12 being supplied to transformer 88, and the modulation products being fed to detector 20.

Since the harmonics of a one-megacycle reference oscillator are one megacycle apart, it would appear that an interpolation or auxiliary oscillator such as oscillator 18 could cover the range between adjacent harmonics of the crystal frequency if it were tunable from 0 to 1 megacycle. As a practical matter, however, this would require an auxiliary oscillator of extremely difficult construction, since its tuning range includes very low frequencies and the achievement of the necessary degree of stability would require an expensive and unwieldy structure. For this reason, the present invention utilizes an auxiliary oscillator, tunable through a higher range, and for the embodiment being described, the range from 1 to 2 megacycles is employed, and this is the reason for arranging matters so that the harmonic multiplier 12 tracks 1.5 megacycles above the transfer oscillator frequency. The instrument can still be read directly, because the geared dial of the auxiliary oscillator reads from .000 to 1.000 as the oscillator itself is tuned from 2 to 1 megacycles per second. Since it is the difference frequency (lower sideband) output of modulator 16 which is utilized, the megacycle indication of dial 170 will be correct because the harmonic multiplier output is actually from 1 to 2 megacycles higher than the frequency of the transfer oscillator, the tank circuit of the multiplier being tuned to a frequency 1.5 megacycles above the frequency of the frequency of the transfer oscillator. An example will make this clear; assuming that the reference oscillator is standardized at 1 megacycle, and the desired range of the instrument is from 20 to 40 megacycles, the transfer oscillator is tunable from 20 to 40 megacycles, and the tank circuit of the multiplier 12 is tunable from 21.5 to 41.5 megacycles. Dial 170 is adjusted to zero-beat the incoming signal with the signal from the transfer oscillator 14. If the frequency of the unknown signal is (say) 24.557 megacycles, zero-beat will be obtained with dial 170 reading some value between 24 and 25 megacycles, as shown in Fig. 1. Since multiplier 12 tracks 1.5 megacycles above the transfer oscillator, the maximum of its selectivity curve or resonance will center at about 26 megacycles, and the 26th harmonic of crystal oscillator 10 will appear strongly in the output of the multiplier. With the instrument set in Read condition, dial 172 will be adjusted to obtain zero beat against the output of the transfer oscillator. Since the frequency of the auxiliary oscillator runs from 2.000 megacycles to 1.000 megacycles while its dial 172, 174 passes from .000 to 1.000, the frequency generated is equal to 2 minus the dial reading, and it is this frequency which is subtracted from the 26th harmonic to zero-beat the signal from the transfer oscillator. Thus $$24.557 = 26.000 - (2 - .557) = 24 + .557$$

The sum frequency, which would be $26.000 + (2 - .557)$ or 27.443, cannot be obtained with any setting of dials 172, 174, because the ganging of the controls of the transfer oscillator and of the multiplier ensures that the 27th harmonic of the reference crystal oscillator (and all other harmonics) has been strongly attenuated in the resonant circuit of the multiplier.

It is apparent from the above that the device may be used as a signal generator with the function switch set at the Read position. The transfer oscillator is then set at approximately the desired frequency, or as nearly as can be obtained from the dial 170 associated therewith. The auxiliary oscillator is then tuned to indicate, as read in connection with the first mentioned dial, the exact frequency desired, after which the transfer oscillator is retuned as necessary for the zero-beat condition indicative of the particular frequency selected.

Since it is desired to use the crystal standard oscillator to calibrate the auxiliary oscillator, the third or Calibrate position, i. e. with the switch arms engaging contacts c, is provided for that purpose. In this switch position input lead 22 is disconnected and the output of crystal oscillator 10 is fed to detector 20 via switch 130c, the plate circuit of transfer oscillator 14 being open at 138c to deenergize that oscillator. The fundamental frequency of oscillator 10 can now be compared with the output of auxiliary oscillator 18, and the dial associated with the latter circuit may be calibrated at 1.000 reading, which actually is 1 mc., the fundamental of the oscillator 10. Calibration at .500 and 0.000 readings can also be carried out in the same manner, but using second and third harmonics. An adjustable trimmer for adjusting oscillator 18 to zero-beat at these points is shown at 178. The auxiliary oscillator may be supplied with a curve for correction of its dial reading, to allow for production tolerances in the variable capacitor and consequent calibrating corrections between these check points. Calibration as above described is of course subject to correction factors from the curve, and should re-calibration of the auxiliary oscillator be needed, a 1 to 2 mc. frequency source with suitable accuracy should be used.

The above description covers the provision of only three check points for calibrating the low frequency auxiliary oscillator. These particular three check points or marker frequencies are emphasized at the expense of other potential marker frequencies derivable from the one megacycle reference oscillator 10. This is accomplished because of the fact that the signal from the low frequency auxiliary oscillator 18 is derived from its high Q tuned circuit between the control grid and cathode of tube 118, rather than from the untuned plate circuit. The invention is not, however, to be considered limited to this connection, because if additional marker frequencies for calibration of the dial of oscillator 18 are desired, this can readily be accomplished by deriving the output of oscillator 18 through a suitable network in its plate circuit, which would vastly increase the harmonics available for providing additional check points against the reference oscillator 10. In this case, some additional care would be needed in operation to insure that the proper marker frequency corresponding to a given dial position is used. Another way in which a larger number of check points could be obtained would be to couple from the auxiliary oscillator 18 as at present, but replacing the one megacycle oscillator 10 with the combination of, say, a 50 kilocycle crystal oscillator followed by an additional harmonic multiplier to produce a stabilized frequency of 1 megacycle which would be fed to the present harmonic multiplier 12.

This combination would provide marker frequencies for calibration for the auxiliary oscillator spaced 50 kilocycles apart, and would greatly increase the accuracy of calibration of the auxiliary oscillator and hence of the instrument.

The fourth or Modulate position of switch 139—140 is employed for conversion of the device to operate as a signal generator with an audio modulated output. With contact arm 134 engaging fixed contact d, audio oscillator circuit 26 is converted, through conduit 180 and capacitor 182, into a Hartley audio oscillator, connected through switch terminal 138d and conduit 188 to Heising modulate the output of transfer oscillator circuit 14.

For frequency measurement of a strong local signal, a pick-up antenna may be plugged directly into the "output" jack. The function switch is placed in the Beat position. The knob controlling dial 170 is turned slowly in the vicinity of the expected frequency until a beatnote is heard in the phones. For frequencies above the fundamental range of the transfer oscillator dial 170, a proper multiple is selected. The signal is carefully zero-beat, after which the function switch is moved to the Read position. The knob controlling dials 172 and 174 is then turned to the vicinity of the desired signal. For example, if the left hand dial, 170, reads midway between 24 and 25, as shown, the signal will be found in the vicinity of .500 on dials 172 and 174. When the beat note is heard, dials 172, 174 are adjusted to zero-beat in the center of the most intense beat note. The correction factor is applied to the reading of dials 172 and 174, and the reading of these dials, taken in connection with the reading of dial 170, and the whole multiplied by the proper range factor, gives the measured frequency to the desired accuracy.

The instrument as described herein utilizes a reference oscillator 10 having a single fundamental frequency, together with its harmonics; it is of course feasible to utilize a plurality of stabilized reference oscillators of different frequencies, or a single oscillator with a plurality of interchangeable frequency-controlling elements (crystals or the like) to supply the desired carriers to the modulator 16. The means for selecting the desired fundamental would still be gang-connected with the transfer oscillator 14 to accomplish automatic correlation and thus to permit the direct reading dial system as shown herein.

The present invention has also been described in connection with a transfer oscillator 14 having a fundamental range running from 20 to 40 megacycles, which permits covering the entire range from 20 to 480 megacycles by use of the second, fourth, eighth and twelfth harmonics, and by applying the appropriate multiplier to the reading of the instrument. It would be equally possible to use only the fundamental frequency of a suitable transfer oscillator capable of covering the entire range; for example, a high frequency oscillator utilizing tuning elements of the "butterfly" type, or equivalents.

The above and other changes and modifications which fall within the skill of those trained in this art are not to be taken as outside the spirit of the invention, except as the same may be limited by the scope of the appended claims.

We claim:

1. In a high frequency measuring apparatus, a precision oscillator operating at a fixed frequency substantially lower than that of a signal to be measured, a variable oscillator tunable over a range encompassing the frequency of the signal to be measured, harmonic generator means connected to the output of said precision oscillator for generating oscillations harmonically related to its fixed frequency, a tunable resonant circuit coupled to the output of said generator means, means for simultaneously adjusting the frequency of said variable oscillator and the tuning of said circuit such that the latter resonates at a frequency a predetermined amount higher than the adjusted frequency of said variable oscillator, an auxiliary oscillator tunable over a frequency band at least as great as the frequency of said precision oscillator and which band includes a frequency equal to said predetermined amount, modulator means connected to modulate the output frequency of said resonant circuit with the output frequency of said auxiliary oscillator and to suppress both of said frequencies, and means for comparing the lower sideband output frequency of said modulator with the output frequency of said variable oscillator.

2. In a high frequency measuring and signal generating apparatus, a precision oscillator operating at a fixed frequency substantially lower than that of a signal to be measured or generated, a variable oscillator tunable over a range encompassing the frequency of the signal to be measured or generated, harmonic generator means connected to the output of said precision oscillator for generating oscillations harmonically related to its fixed frequency, a tunable resonant circuit coupled to the output of said harmonic generator means, means for simultaneously adjusting the frequency of said variable oscillator and the tuning of said circuit such that the latter resonates at a frequency a predetermined amount higher than the adjusted frequency of said variable oscillator, an auxiliary oscillator tunable over a frequency band at least as great as the frequency of said precision oscillator and which band includes a frequency equal to said predetermined amount, modulator means connected to modulate the output frequency of said resonant circuit with the output frequency of said auxiliary oscillator and to suppress both of said frequencies, means for comparing the lower sideband output frequency of said modulator with the output frequency of said variable oscillator, and means for connecting the output of said variable oscillator to an external circuit.

3. In a high frequency measuring apparatus, a precision oscillator operating at a fixed frequency substantially lower than that of a signal to be measured, a variable oscillator tunable over a range encompassing the frequency of the signal to be measured, harmonic generator means connected to the output of said precision oscillator for generating oscillations harmonically related to its fixed frequency, a tunable resonant circuit coupled to the output of said generator means, frequency-calibrated dial means for simultaneously adjusting the frequency of said variable oscillator and the tuning of said circuit such that the latter resonates at a frequency a predetermined amount higher than the adjusted frequency of said variable oscillator, an auxiliary oscillator tunable over a frequency band at least as great as the frequency of said precision oscillator and which band includes a frequency equal to said predetermined amount, frequency-calibrated dial means for tuning said auxiliary oscillator, modulator means connected to modulate the output frequency of said resonant circuit with the output frequency of said auxiliary oscillator and to suppress both of said frequencies, and means for comparing the output of said modulator with the output frequency of said variable oscillator.

4. Apparatus in accordance with claim 3, in which said respective dial means are located with their calibration indications adjacent one another so as to provide a single indication comprising the reading of the first dial means plus the reading of the second dial means.

5. In a high frequency measuring apparatus, a first variable oscillator tunable over a predetermined range, a precision fixed-frequency oscillator, a frequency multiplier controlled by said precision oscillator, a tunable output circuit connected to resonate said frequency multiplier in the region of a desired multiple of the frequency of said precision oscillator, unicontrol means for varying the frequency of said variable oscillator and for simultaneously adjusting the tuning of said multiplier output circuit to a frequency differing by a fixed amount from the frequency of the variable oscillator, a second variable oscillator covering a band width equal to the frequency of said precision oscillator, which band includes a frequency equal to said fixed amount, lattice modulator means connected to the output of said frequency multiplier and arranged to modulate the said output with the output of said second variable oscillator to produce sideband frequencies, and means for comparing one of said sideband frequencies with the output of said first variable oscillator.

6. The invention in accordance with claim 3, in which the frequency-calibrated dial means for tuning said auxiliary oscillator comprises a pair of indicating dials geared to one another for rotation in the same direction.

7. The invention in accordance with claim 6, in which the dial means are aligned for reading their respective indications at a common point as a single multi-digit indication of frequency.

8. The invention in accordance with claim 1, in which said modulator means comprises a balanced, lattice-type modulator circuit.

9. The invention in accordance with claim 1, in which said modulator means comprises a balanced lattice-type modulator with a crystal diode rectifier element in each branch thereof.

10. In a high frequency measuring apparatus, a precision oscillator operating at a fixed frequency substantially different from that of a signal to be measured, a variable oscillator tunable over a range encompassing the frequency of the signal to be measured, harmonic generator means connected to the output of said precision oscillator for generating oscillations harmonically related to its fixed frequency, a tunable resonant circuit coupled to the output of said generator means, means for simultaneously adjusting the frequency of said variable oscillator and the tuning of said circuit such that the latter resonates at a frequency a predetermined amount different from the adjusted frequency of said variable oscillator, an auxiliary oscillator tunable over a frequency band at least as great as the frequency of said precision oscillator, modulator means connected to modulate the output frequency of said resonant circuit with the output frequency of said auxiliary oscillator and to suppress both of said frequencies, and means for comparing one of the sideband output frequencies of said modulator with the output frequency of said variable oscillator.

11. In a high frequency measuring apparatus, a first variable oscillator tunable over a predetermined range, a precision fixed-frequency oscillator, a frequency multiplier controlled by said precision oscillator, a tunable output circuit connected to resonate said frequency multiplier in the region of a desired multiple of the frequency of said precision oscillator, unicontrol means for varying the frequency of said variable oscillator and for simultaneously adjusting the tuning of said multiplier output circuit to a frequency differing by a fixed amount from the frequency of the variable oscillator, a second variable oscillator covering a band width equal to the frequency of said precision oscillator, balanced modulator means connected to the output of said frequency multiplier and arranged to modulate the said output with the output of one of said variable oscillators to produce sideband frequencies, and means for comparing one of said sideband frequencies with the output of the other of said variable oscillators.

References Cited in the file of this patent

UNITED STATES PATENTS

| Number | Name | Date |
| --- | --- | --- |
| 1,934,879 | Potter | Nov. 14, 1933 |
| 2,186,182 | Stocker | Jan. 9, 1940 |
| 2,324,077 | Goodale et al. | July 13, 1943 |
| 2,398,694 | Case | Apr. 16, 1946 |
| 2,401,481 | Harnett | June 4, 1946 |
| 2,451,320 | Clammer | Oct. 12, 1948 |
| 2,491,494 | Grimm | Dec. 20, 1949 |

FOREIGN PATENTS

| Number | Country | Date |
| --- | --- | --- |
| 596,889 | Great Britain | Jan. 13, 1948 |